US006772055B2

(12) United States Patent
Hagelin

(10) Patent No.: US 6,772,055 B2
(45) Date of Patent: Aug. 3, 2004

(54) SYSTEM, A VEHICLE AND A METHOD CONCERNING THE BEHAVIOR OF A VEHICLE

(75) Inventor: Hans-Ove Hagelin, Linkopung (SE)

(73) Assignee: Saab AB (SE)

( * ) Notice: Subject to any disclaimer, the term of this patent is extended or adjusted under 35 U.S.C. 154(b) by 0 days.

(21) Appl. No.: 10/169,383

(22) PCT Filed: Jan. 11, 2001

(86) PCT No.: PCT/SE01/00042

§ 371 (c)(1),
(2), (4) Date: Jul. 2, 2002

(87) PCT Pub. No.: WO01/52008

PCT Pub. Date: Jul. 19, 2001

(65) Prior Publication Data

US 2003/0004615 A1 Jan. 2, 2003

(30) Foreign Application Priority Data

Jan. 13, 2000 (SE) .............................................. 0000088

(51) Int. Cl.$^7$ ................................................. G05D 1/10
(52) U.S. Cl. .............................. 701/27; 701/1; 701/23; 701/40; 701/44; 701/57; 701/59; 701/77; 701/98; 244/195
(58) Field of Search ............................... 701/1, 70, 23, 701/27, 40, 44, 57, 59, 77, 98; 244/76 R, 175, 190, 195

(56) References Cited

U.S. PATENT DOCUMENTS

| | | | | |
|---|---|---|---|---|
| 4,853,720 A | * | 8/1989 | Onari et al. ................. | 701/110 |
| 5,475,594 A | * | 12/1995 | Oder et al. .................... | 701/14 |
| 6,122,572 A | * | 9/2000 | Yavnai .......................... | 701/23 |
| 6,317,659 B1 | * | 11/2001 | Lindsley et al. ............... | 701/1 |

FOREIGN PATENT DOCUMENTS

WO          9635982          11/1996

OTHER PUBLICATIONS

J. Malec, An AI–based Design of a Driver Information Unit; Department of Computer and Information Science, Linköping University, Linköping, Sweden, May 13, 1996, pp. 1–11.
A. Schultz et al., Adaptive Testing of Controllers for Autonomous Vehicles, Proc. Of the 1992 Symposium on Autonomous Underwater Vehicle Technology, Jun. 1992, Washington, D.C., IEEE, pp. 158–164.
S. Kannan et al., Control Algorithm and Flight Simulation Interation Using the Open Control Platform for Unmanned Aerial Vehicles, Georgia Institute of Technology, Atlanta, Georgia 30332, 1999 IEEE, pp. 6.A.3–1 to 6.A.3–10.

* cited by examiner

Primary Examiner—William A. Cuchlinski, Jr.
Assistant Examiner—Eric M. Gibson
(74) Attorney, Agent, or Firm—Swidler Berlin Shereff Friedman, LLP

(57) ABSTRACT

The invention concerns a system for generating basis for decisions concerning the behavior of a vehicle and/or of a driver of a vehicle. The system comprises a supervising unit (10) which comprises at least one storage member (12). In the storage member (12) there is a set of rules (14) of a particular kind for how the driver of the vehicle and/or the vehicle shall behave in different situations. The system also comprises a user interface (16) and adaptation means (13) arranged to adapt said set of rules such that at least some of the rules (14) with conclusions (24) belonging thereto are suited to form the basis for decisions concerning the behavior of a vehicle and/or of a driver of a vehicle. The invention also concerns a vehicle and a method of generating basis for decisions concerning the behavior of a vehicle and/or of a driver of a vehicle.

15 Claims, 4 Drawing Sheets

SYSTEM, A VEHICLE AND A METHOD CONCERNING THE BEHAVIOR OF A VEHICLE

BACKGROUND OF THE INVENTION

The present invention concerns a system for generating basis for decisions concerning the behaviour of a vehicle and/or of a driver of a vehicle. The invention also concerns a method of generating basis for decisions concerning the behaviour of a vehicle and/or of a driver of a vehicle and a vehicle comprising means which comprises basis for decisions for the behaviour of the vehicle.

As an example of a vehicle will below primarily an aeroplane be used. The vehicle in question may however be any kind of vehicle, for example a car, a boat, a helicopter etc. The invention is thus not limited to an aircraft. The invention primarily concerns the behaviour of real vehicles. Within the scope of the invention is however also the possibility that the vehicle is simulated. A vehicle simulator may for example be used to train a driver of a real vehicle.

A driver of a vehicle must often make quick decisions concerning how the vehicle is to be controlled. For example, a flight with an aeroplane requires many different decisions concerning the behaviour of the aeroplane, both concerning the actual flying of the aeroplane and concerning the execution of different missions. It therefore exists a desire to simplify for a driver to fly an aeroplane. In certain cases an aeroplane may also be unmanned. Such an unmanned aeroplane is often programmed to behave in a certain manner.

In order to simplify and make the operation of a vehicle more efficient it is common that the behaviour of the vehicle at least to a certain degree is made automatic. Furthermore, it is known that the driver of a vehicle may receive information concerning suitable measures that should be carried out concerning the behaviour of the vehicle.

There is however a need to simplify and to improve the production of basis for decisions for the behaviour of a vehicle or of a driver of a vehicle.

Prior known devices for the control of the behaviour of one or more vehicles involve different problems. For example, it is often difficult for a user without programming experience to make changes in the set of rules which control the behaviour. It may thereby be difficult to get an overview over the rules which control the vehicle. Furthermore, it may be difficult for a user to realise the consequences of an added rule in a longer list of rules for the behaviour of the vehicle in different situations. Furthermore, it may be time consuming and difficult to create new sets of rules which realistically describe the behaviour of the vehicle or of a driver of the vehicle.

SUMMARY OF THE INVENTION

A first purpose of the present invention is to achieve a system for generating basis for decisions concerning the behaviour of a vehicle and/or of a driver of a vehicle. A purpose is thereby that such a system should be obtained in a relatively simple manner and that the system should be easy to use also for people with limited knowledge concerning the details of the structure of the system. A further purpose is that it should be easy for a user to get an overview and to make changes in the rules which are intended to control said behaviour or to form the basis of said behaviour.

A second purpose of the present invention is to achieve a vehicle comprising means for simplifying the operation of the vehicle.

A third purpose of the present invention is to achieve a method of generating basis for decisions concerning the behaviour of a vehicle and/or of a driver of a vehicle. A purpose is thereby that the method has advantages corresponding to the above mentioned concerning the system.

The first purpose is achieved in that the system comprises:
- a supervising unit which comprises at least one storage member which comprises a set of rules for how the driver of the vehicle and/or the vehicle shall behave in different situations, which supervising unit is arranged to administer the rules,
- a user interface comprising first means for presenting information to a user of the system and second means for inputting instructions to said supervising unit such that a user with the help of said second means may modify said set of rules, wherein the system is arranged such that each rule comprises one of more predetermined and pre-programmed premises which may either be true or false and one or more predetermined and pre-programmed conclusions, wherein the system is arranged such that each premise in the rule is assigned an indicator which may indicate three different conditions, viz. a first condition which is that the premise shall be true, a second condition which is that the premise shall be false and a third condition which is that it does not matter whether the premise is true or false, and wherein at least one conclusion in the rule is suited to be executed if all of said premises fulfil the conditions set by the assigned indicators, and
- adaptation means arranged to adapt said set of rules such that at least some of the rules which conclusions belonging thereto are suited to form the basis for decisions concerning the behaviour of a vehicle and/or of a driver of a vehicle.

Since the premises are assigned said indicators it is possible to in a simple manner make changes in a rule by changing one or more of said indicators. In order to make a change in a rule it is thus not always necessary to add or to remove premises or conclusions, it may instead be sufficient to change one or more of said indicators. The indicators may thus be seen as a kind of operators which determine the function of the respective premise. With the help of said adaptation means, the rules may be structured and selected such that they in a suitable manner form the basis for decisions concerning the behaviour.

According to an embodiment of the system, the system comprises transferring means arranged for transferring at least some of said set of rules and said basis for decisions to a presentation computer device which comprises means for presenting said basis for decisions to a driver of a vehicle while the vehicle is in operation. With the help of such a presentation computer device, a driver may receive recommendations concerning different behaviours. A conclusion which follows from the rules may thus be shown to the driver when the driver should execute that which the conclusion states. It should be noted that said means for presenting may concern visual as well as auditory information.

According to a further embodiment of the system, the system comprises transferring means arranged for transferring at least some of said set of rules and said basis for decisions to a command computer device which is arranged to control the behaviour of a vehicle without influence of a driver. The rules are thereby adapted to be used in a command computer device which automatically controls the behaviour of a vehicle. Of course, the system may comprise transferring means which adapts a set of rules both to a presentation computer device and to a command computer device. For example, certain behaviours may be suitable to be executed automatically while other behaviours suitably are presented to a driver as a recommended behaviour.

According to another embodiment of the system, the system is arranged such that the behaviour of said driver and/or of said vehicle is divided into a plurality of states for different situations in which the vehicle may be, wherein said plurality of states are divided into a network or a hierarchy of states, wherein the system is arranged to show, in response to a command from a user via said user interface, a window which illustrates said network or hierarchy of states. Through this embodiment, a user may get a good overview over different situations in which a vehicle may be. This makes it easier to make changes in the rules which control the vehicle in different situations. Suitably, the system is also arranged such that a user via said user interface may create new states. The user may thus in a simple manner modify the structure of the states.

According to another embodiment of the system, the system is arranged such that each state comprises a plurality of said rules which are divided into one or more rule-blocks which concern different aspects of the state, wherein the rule or rules which form part of a certain rule-block on a command from a user via said user interface are shown as a rule-block window. A user may thereby get a good overview over the rules which form part of a rule-block without being distracted by other rules which are not relevant to the rule-block in question.

According to another embodiment of the system, the system is arranged such that a rule is organised such that it may comprise several conclusions, wherein each conclusion is assigned an indicator which may indicate two different cases, a first case which indicates that the conclusion shall be executed or a second case which indicates that the conclusion shall not be executed, wherein a conclusion is meant to be executed if all of said premises fulfil the conditions set by the assigned indicators and the indicator of the conclusion indicates said first case. Thereby a good overview is achieved of different possible conclusions in connection with one or more rules and of which conclusion or conclusions that are to be executed.

According to another embodiment of the system, the system is arranged to show, in said rule-block window, all premises and conclusions which form part of the different rules which form part of a certain rule-block, wherein for each rule in the rule-block said indications which indicate said conditions and cases are shown as marks for the respective premises and conclusions. A user of the system will thereby get a good overview over all premises and conclusions which are relevant to the rule-block in question. Through said marks, a good overview is also achieved over the different premises and conclusions that are relevant to the different rules in the rule-block.

According to another embodiment of the system, the system is arranged such that a user with the help of said second means of the user interface may change the indications of said indicators. For example, the user may change said indications by one or a few depressions of a key on a keyboard or of a button on a computer mouse.

Said second purpose of the invention is achieved by a vehicle which comprises a presentation computer device which comprises at least said set of rules and said basis for decisions transferred to the presentation computer device according to the above mentioned embodiment of the system, wherein said presentation computer device also comprises said means for presenting said basis for decisions to a driver of the vehicle while the vehicle is in operation. A driver of a vehicle may thus obtain information concerning a suitable behaviour at different moments in time while the vehicle is in operation.

According to an embodiment of the vehicle, the presentation computer device is arranged to present at least some of said basis for decisions to a driver of the vehicle in response to a command from said driver. The driver may thus choose when recommended behaviour is to be presented and for example which kind of behaviour that is to be presented.

According to another embodiment of the vehicle, the presentation computer device is arranged to automatically present at least some of said basis for decisions to a driver of the vehicle without any special command from said driver. According to this embodiment, the presentation is thus carried out automatically without any need for the driver to request it.

The second purpose of the invention is also achieved by a vehicle which comprises a command computer device which comprises at least said set of rules and said basis for decisions transferred to the command computer device according to the above mentioned embodiment of the system, wherein said command computer device is arranged to control at least a part of the behaviour of a vehicle without influence of a driver. This automatic behaviour does thus not require any action by a driver. A driver may thus be seen to delegate certain kinds of behaviour to the command computer device. It is also possible that the command computer device takes care of all behaviour of the vehicle. This may for example be suitable in an unmanned aircraft. It is also possible that the vehicle comprises both a presentation computer device and a command computer device. These devices may also form part of one and the same computer device in the vehicle.

The third purpose of the invention is achieved by a method which comprises the steps to:
  create a set of rules for how the driver of the vehicle and/or the vehicle shall behave in different situations,
  provide a user interface comprising first means for presenting information to a user of the rules and second means for inputting instructions such that a user with the help of said second means may modify said set of rules, wherein said rules are created such that each rules comprises one or more predetermined premises which may either be true or false and one or more predetermined conclusions, wherein each premise in the rule is assigned an indicator which may indicate three different conditions, viz. a first condition which is that the premise shall be true, a second condition which is that the premise shall be false and a third condition which is that it does not matter whether the premise is true or false, and wherein at least one conclusion in the rule is suited to be executed if all of said premises fulfil the conditions set by the assigned indicators, and to adapt at least some of said rules with conclusions belonging thereto to a form such that they are suited to form the basis for decisions concerning the behaviour of a vehicle and/or of a driver of a vehicle.

According to this method, advantages corresponding to those described above in connection with the system are achieved. Advantageous embodiments of the method are clear from the remaining claims and from the further description.

SHORT DESCRIPTION OF THE DRAWINGS

The present invention will now be explained with the help of embodiments given as examples and with reference to the annexed drawings.

DESCRIPTION OF EMBODIMENTS OF THE INVENTION

An embodiment of the invention will next be described with reference to the figures. The system according to the invention is inter alia arranged to show different windows. Examples of such windows are shown in FIGS. 2–5. The invention is in no way limited to the text that exists in these figures. This text should thus only be seen as symbolic. Furthermore, it is the case that systems for the control of the behaviour of vehicles are known per se to the person skilled in the art. Details of such systems will therefore not be described below. Instead, the below description concentrates on the essential aspects of the present invention.

Figure 1:
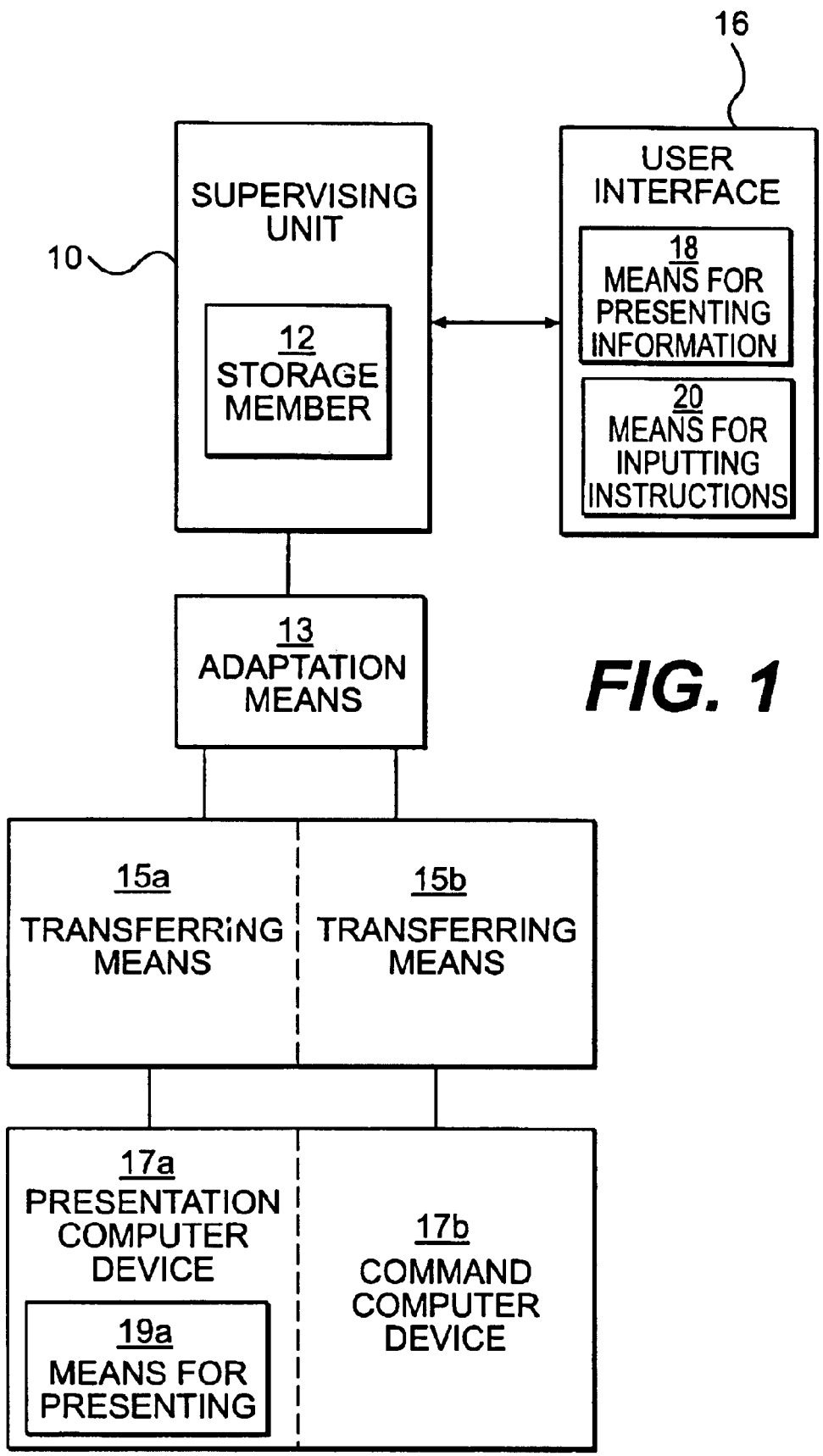
FIG. 1 shows schematically a system according to the invention in the form of a block diagram.

First below the function of the rule-handling in the system will be described. FIG. 1 shows schematically a system according to the invention. The system comprises a supervising unit 10. Such a supervising unit 10 may consist of a computer device. The supervising unit 10 comprises at least one storage member 12. In this storage member 12 a set of rules 14 (see FIG. 3) which control the behaviour of a vehicle is stored. With behaviour or action of a vehicle is meant also such behaviour or action which is manually caused by a driver of the vehicle. The rules 14 thus concern the behaviour of the vehicle and/or of the driver of the vehicle. The system also comprises a user interface 16. The user interface 16 comprises first means 18 for presenting information to a user. These first means 18 may for example include a screen, load speakers or similar devices. The user interface 16 also comprises second means 20 for inputting instructions to the supervising unit 10. These second means 20 may for example consist of a keyboard, a microphone, a computer mouse or the same.

Figure 2:
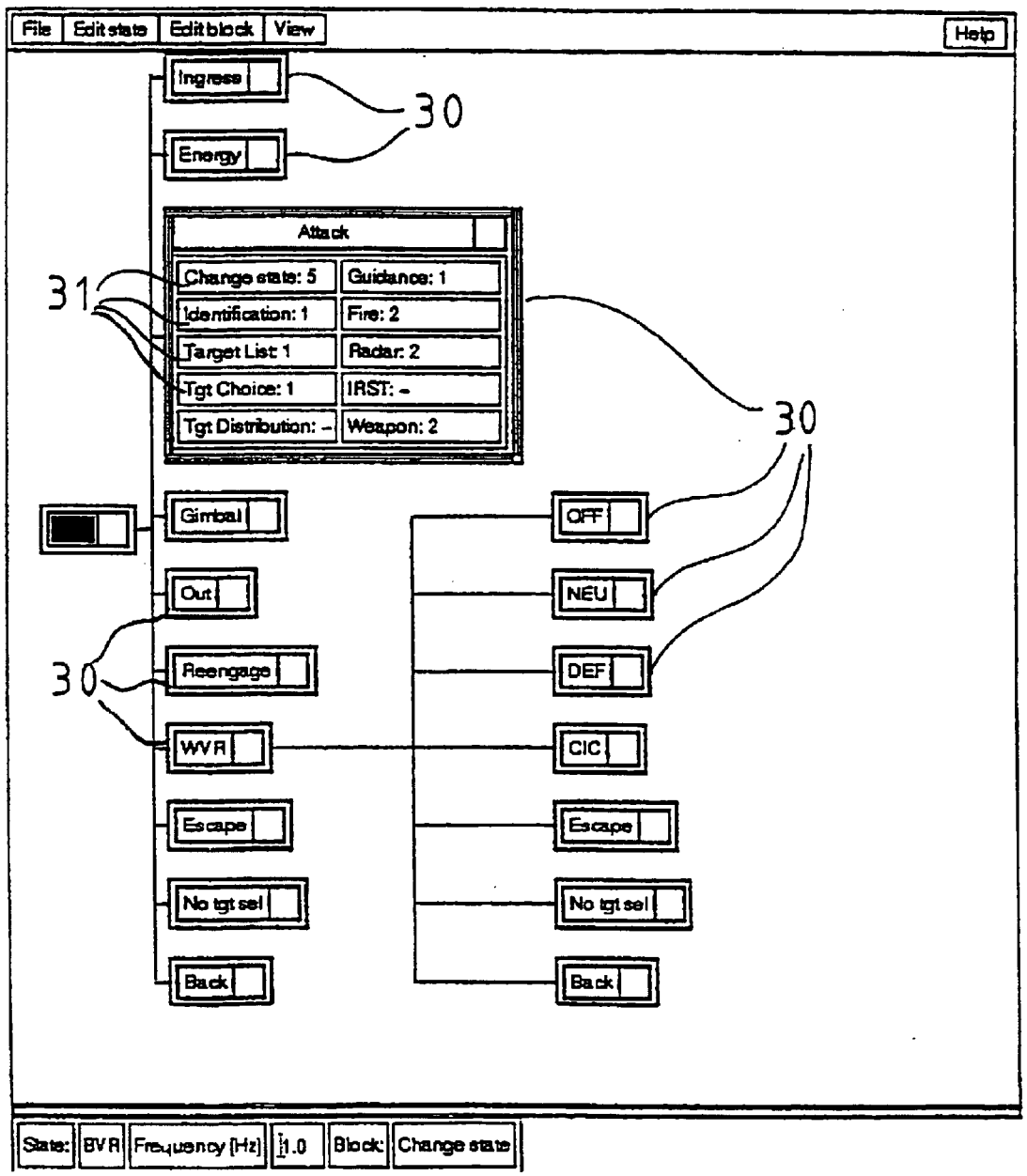
FIG. 2 shows an example of a window of states which may be shown with the system according to the invention.

In order to simplify for a user to get an overview over the behaviour of the vehicle and for in a simple manner being able to select different situation in the behaviour of a vehicle, the system is arranged such that the control of the behaviour is divided into a plurality of states 30 (see FIG. 2). These states 30 represent different situations in which the vehicle may be. The states 30 are suitably divided into a network or a hierarchy of states 30. A certain state 30 may have 0, 1 or more sub-states. For example, FIG. 2 shows that the state that is marked "Out" does not have any sub-state. On the other hand, the state that is marked with "WVR" has seven different sub-states. The system is arranged to show, in response to a command from a user, for example via the keyboard or the computer mouse, a window (FIG. 2) which illustrates the network or the hierarchy of states 30.

The system is also arranged such that a user may create new states 30 or remove states 30. States 30 may for example be added or removed by first clicking on a menu in the upper part of the window (FIG. 2) which illustrates said hierarchy of states 30. Alternatively, it is conceivable that new states 30 are created or that states 30 are removed by clicking with the computer mouse directly on the states 30 which are shown in the window. In case the states 30 are divided into a hierarchy, for example the following grouping is conceivable: a highest level where it is indicated which kind of aeroplane that is involved, a second level which indicates different kinds of missions that the aeroplane may carry out, a third level which indicates different phases of the different missions and so on.

The behaviour of the vehicle in a certain state 30 is controlled by a plurality of rules 14. The rules 14 which form part of a state 30 may be divided into a plurality of rule-blocks 31. FIG. 2 thus shows that the state 30, which is indicated with "Attack", comprises ten rule-blocks 31. Each rule-block 31 may concern a certain aspect of the state 30. Each rule-block 31 thus comprises the rule or rules 14 which are relevant to the rule-block 31 in question.

Figure 3:
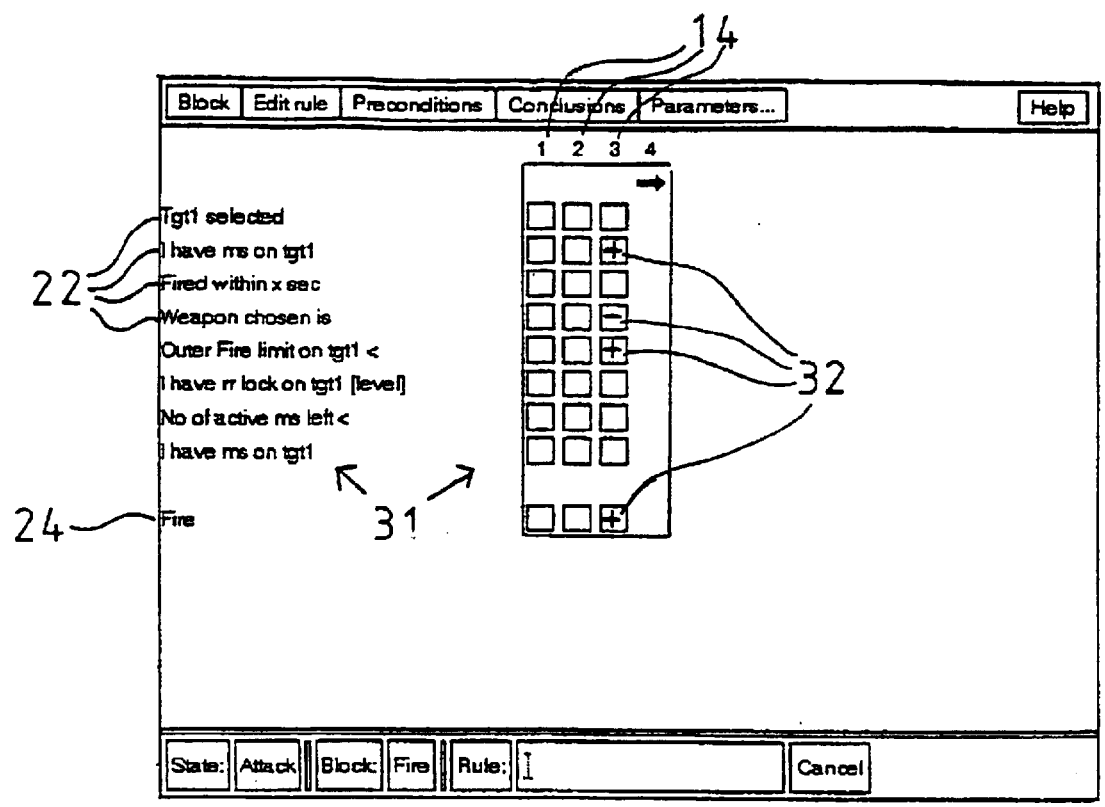
FIG. 3 shows an example of a rule-block window which may be shown with the system according to the invention.

The system is arranged to show, in response to a command from a user via the user interface 16, a rule-block 31 with the help of a rule-block window (FIG. 3). Each rule 14 comprises one or more predetermined premises 22 which may either be fulfilled or not fulfilled, i.e. they may be true or false. Furthermore, a rule 14 comprises one of more predetermined conclusions 24 (the rules 14 in the rule-block window which is shown in FIG. 3 only have one conclusion 24). The rule-block window in FIG. 3 comprises three rules 14 marked with 1, 2 and 3. Each rule 14 is thus represented by a column in the rule-block window. In the rule-block window all premises 22 and conclusions 24 which form part of the different rules 14 which form part of the rule-block 31 are shown. In a similar manner as concerning the states 30, the system is arranged such that a user may add or remove premises 22 or conclusions 24 to or from the different rules 14.

Each premise 22 in a rule 14 is assigned an indicator which may indicate three different conditions, viz. a first condition which is that the premise 22 shall be true, a second condition which is that the premise 22 shall be false and a third condition which is that it does not matter whether the premise 22 is true or false. Furthermore, each conclusions 24 in a rule 14 is suitably assigned an indicator which may indicate two different cases: a first case which specifies that the conclusion 24 shall be carried out and a second case which specifies that the conclusion 24 shall not be carried out. A conclusion 24 shall thus be executed if all of said premises 22 fulfil the conditions which are set by the assigned indicators and the indicator of the conclusion 24 indicates that the conclusion 24 shall be executed. The different indications are marked in the columns for the respective rule 14 in the rule-block window. FIG. 3 shows examples of such marks 32 for the rule 14 which is marked with 3. The mark "+" indicates in this case that a premise 22 shall be true or that a conclusion 24 shall be executed. The mark: "−" indicates that a premise 22 shall be false. A white square marks that it does not matter whether the premise 22 in question is false or true. Concerning the rule 3 in FIG. 3 it is thus the case that the conclusion 24 is executed if the second and the fifth premises 22 are true and the forth premise 22 is false. Said marks 32 may of course have another appearance than the shown ones. For example, the marks 32 may thus consist of a black, white or grey square.

The system is arranged such that a user in a simple manner may change the different indications for the premises 22 and the conclusions 24. For example, these indications may be changed in that the user clicks on a computer mouse.

Figure 4:
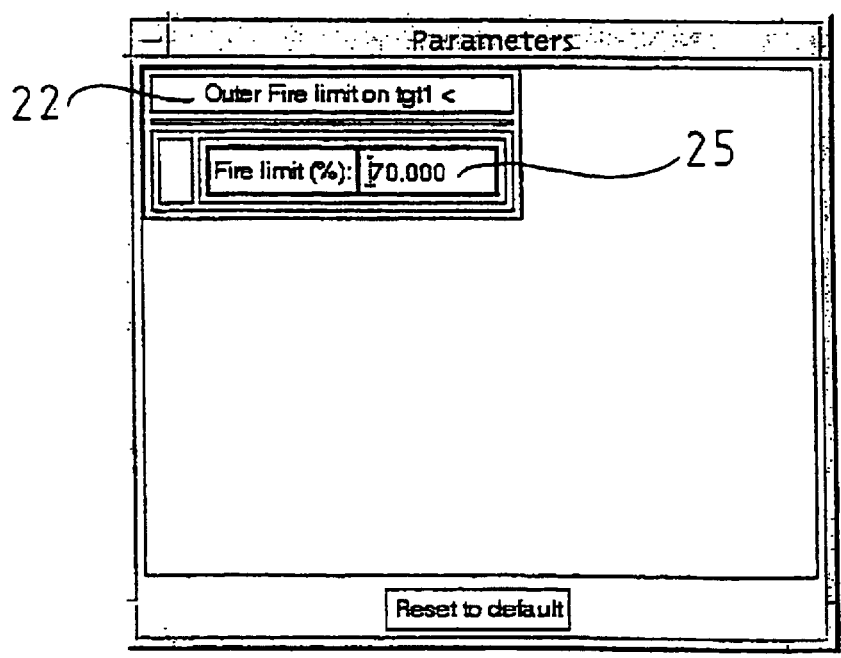
FIG. 4 shows an example of a parameter window may be shown with the system according to the invention.

The system is also arranged such that a user may change the possible parameters 25 which are included in the premises 22 or the conclusions 24. This may for example be done in that a person clicks on a menu in the upper part of the rule-block window. A parameter window (see FIG. 4) may thereby be shown. This parameter window shows a premise 22 or a conclusion 24. In FIG. 4 a premise 22 is shown. The parameter or parameters 25 may thereby be changed by a user. The system is also arranged such that a user in a simple manner may add or remove rules 14 and add or remove premises 22 or conclusions 24 which form part of the different rule-blocks 31.

Figure 5:
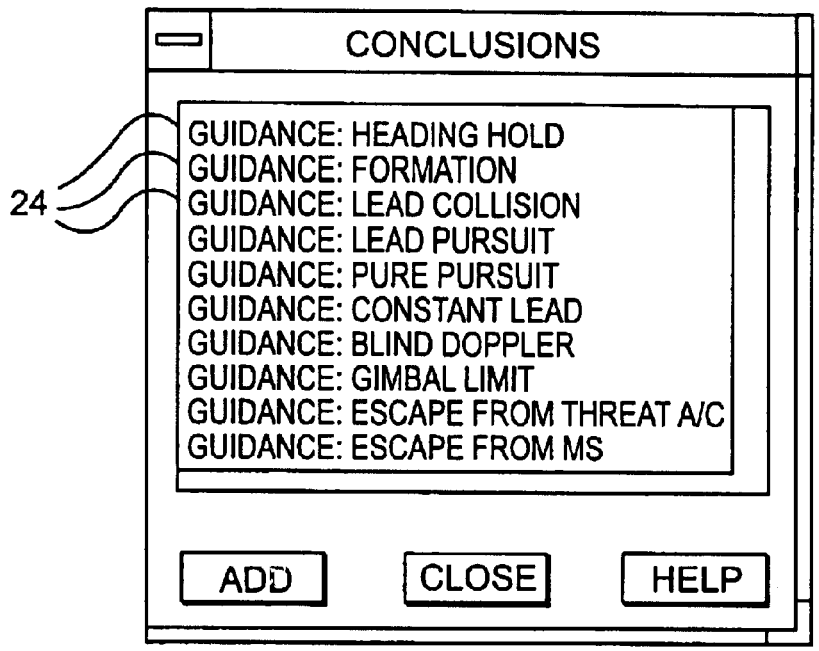
FIG. 5 shows an example of a window of conclusions may be shown with the system according to the invention.
Figure 6:
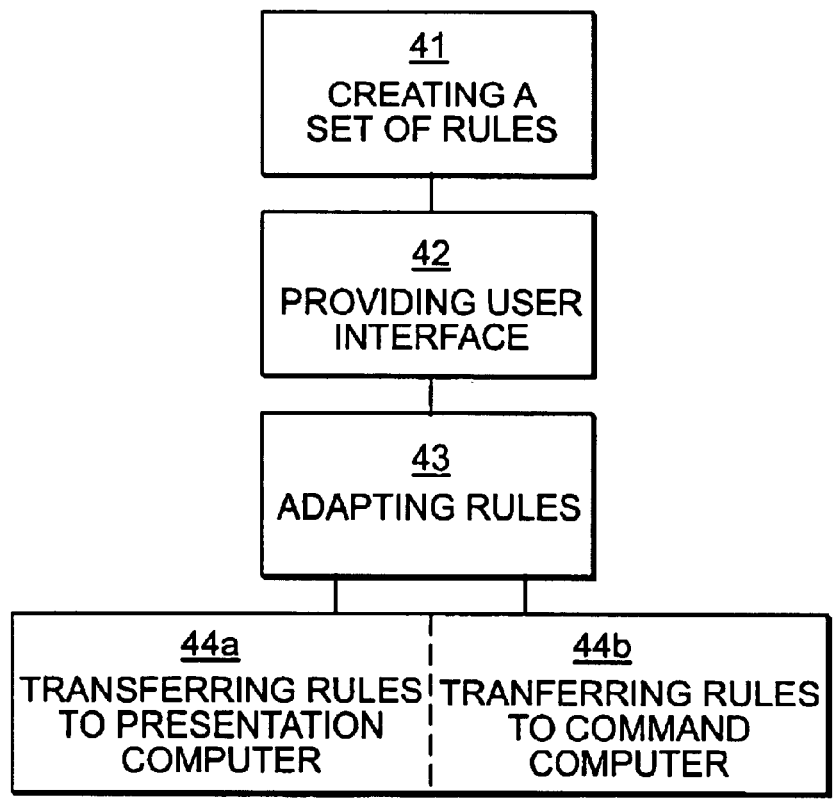
FIG. 6 shows schematically a flow chart for carrying out a method according to the invention.

The system is also arranged to show, in response to a command from a user, a window (see FIG. 5) which comprises all premises 22 or conclusions 24 which are available for the rules, or for a certain state 30 or rule-block 31. FIG. 5 thus shows the conclusions 24 which are available for a certain rule-block 31.

It should be noted that it may vary from state 30 to state 30 which rule-blocks 31 that form part thereof. However, preferably all states 30 comprises a kind of rule-block 31 which describes the rules 14 for when a transition to another state 30 takes place.

When the system is in operation for the control of a behaviour, the different rules 14 in a rule-block 31 are suitably gone through in order. This may for example be carried out by starting with the first premise 22 in the first rule 1 whereafter the remaining premises 22 and the conclusion 24 in the first rule 1 follow. Thereafter, the same order follows for the next rule 2 etc. As soon as a conclusion is executed according to a rule, the rule-block in question is suitably left. The different rule-blocks 31 which form part of a state 30 may suitably be gone through in order. The system also comprises means with which a user may set with which frequency the different rules 14 should be gone through.

FIG. 1 shows that the system comprises adaptation means 13. The adaptation means 13 is arranged to adapt said set of rules 14 such that at least some of the rules 14 with conclusions 24 belonging thereto are suited to form a basis for decisions concerning the behaviour of a vehicle and/or of a driver of a vehicle.

The system also comprises transferring means 15a arranged to transfer at least some of the rules 14 and the basis for decisions to a presentation computer device 17a which comprises means 19a for presenting said basis for decisions to a driver of a vehicle while the vehicle is in operation. The presentation computer device may thus consist of a computer in a vehicle, which computer presents tactic support to a driver of the vehicle. Furthermore, the system comprises transferring means 15b which is arranged to transfer at least a part of the set of rules 14 and the basis for decisions to a command computer device 17b which is arranged to control the behaviour of a vehicle without influence of a driver. Such a command computer device 17b may consist of a command computer in a manned or unmanned vehicle, which command computer controls the behaviour of the vehicle completely or in part. It should be noted that the adaptation means 13 and the transferring means 15a, 15b may together with the supervising unit 10 form one unit. Alternatively, the different units 10, 13, 15a, 15b may form separate units.

The above mentioned adaptation means 13 may for example adapt the rules 14 to a form which is suitable for them to for example constitute tactical support for a driver of a vehicle. This adaptation may for example be that the conclusions 24 are adapted to be able to be understood by a driver of a vehicle. The adaptation means 13 may also adapt the rules 14 to a form which is suitable for them to be able to control the behaviour of a vehicle without influence of a driver. Said transferring means 15a, 15b may for example comprise re-coding of the rule system in order for it to be suitable for the presentation computer device 17a or for the command computer device 17b. It should be mentioned that suitably the whole rule system is transferred to the presentation computer device 17a or to the command computer device 17b, even if not all rules 14 or conclusions 24 are used to be presented to a driver or to control the behaviour of the vehicle.

The invention also concerns a vehicle. Such a vehicle (which is not shown in the figures) comprises a presentation computer device 17a and/or a command computer device 17b of the above mentioned kind. Such a computer device 17a, 17b thus comprises rules and basis for decisions transferred to the computer device 17a, 17b in accordance with what has been described above. The presentation computer device 17a of the vehicle comprises of course means 19a for presenting said basis for decisions to a driver of the vehicle.

In case the vehicle comprises a presentation computer device 17a, this device may be arranged to either present basis for decisions to a driver of the vehicle in response to a command from said driver or this presentation may take place automatically. The presentation computer device 17a may of course be arranged to show certain kinds of basis automatically and other kinds in response to a command from a driver.

The invention also concerns, as has been mentioned above, a method for generating basis for decisions concerning the behaviour of a vehicle and/or of a driver of a vehicle. The method is symbolised by the flow chart in FIG. 5. In a first step 41 a set of rules 14 are created for how the driver of the vehicle and/or the vehicle should act in different situations. In a second step 42 a user interface 16 is provided comprising first means 18 for presenting information to a user of the rules 14 and second means 20 for inputting instructions such that a user with the help of said second means 20 may modify said set of rules 14. The rules are created such that each rule 14 comprises one or more predetermined premises 22 which may either be true or false and one or more predetermined conclusions 24. Each premise 22 in the rule is assigned an indicator which may indicate three different conditions, viz. a first conditions which is that the premise 22 shall be true, a second condition which is that the premise 22 shall be false and a third condition which is that it does not matter whether the premise 22 is true or false. At least one conclusion 24 in the rule 14 is suited to be executed if all of said premises 22 fulfil the conditions set by the assigned indicators. In a third step 43 at least some of said rules 14 with conclusions 24 belonging thereto are adapted to a form such that they are suited to form the basis for decisions concerning the behaviour of a vehicle and/or of a driver of a vehicle.

In a forth step 44a at least a part of said set of rules 14 and said basis for decisions is transferred to a presentation computer device 17a which comprises means 19a for presenting said basis for decisions to a driver of a vehicle while the vehicle is in operation. In an alternative or further step 44b at least a part of said set of rules 14 and said basis for decisions is transferred to a command computer device 17b which is arranged to control the behaviour of a vehicle without influence of a driver.

The adaptation 43 of the rules 14 may for example be done iteratively such that adapted rules 14 are tested in a real or a simulated vehicle whereafter further adaptation 43 of the rules 14 is carried out, whereafter the testing is performed again etc.

The invention is not limited to the described embodiments but may be varied and modified within the scope of the claims.

What is claimed is:

1. A system for generating basis for decisions concerning the behavior of at least one of a vehicle and of a driver of a vehicle, wherein the system comprises:
   a supervising unit comprising at least one storage member comprising a set of rules for how at least one of the driver of the vehicle and the vehicle shall behave in different situations, the supervising unit being arranged to administer the rules,
   a user interface comprising first means for presenting information to a user of the system and second means for inputting instructions to the supervising unit such that a user with the help of the second means may modify the set of rules, wherein the system is arranged such that each rule comprises at least one predetermined and pre-programmed premise which may either be true or false and one or more predetermined and pre-programmed conclusions, wherein the system is arranged such that the at least one premise in the rule is assigned an indicator which may indicate three different conditions, wherein the three conditions comprise a first condition which is that the premise shall be true, a second condition which is that the premise shall be false and a third condition which is that it does not matter whether the premise is true or false, and wherein at least one conclusion in the rule is suited to be executed if all of said premises fulfill the conditions set by the assigned indicators, and
   adaptation means arranged to adapt the set of rules such that at least some of the rules with conclusions belonging thereto are suited to form the basis for decisions concerning the behavior of at least one of the vehicle and of the driver of the vehicle.

2. The system according to claim 1, further comprising:
   transferring means arranged for transferring at least some of the set of rules and the basis for decisions to a presentation computer device which comprises means for presenting the basis for decisions to a driver of a vehicle while the vehicle is in operation.

3. A vehicle, comprising:
   a presentation computer device comprising at least a set of rules and a basis for decisions transferred to a presentation computer device with the system according to claim 2, wherein the presentation computer device also comprises the means for presenting the basis for decisions to a driver of the vehicle while the vehicle is in operation.

4. The vehicle according to claim 3, wherein the presentation computer device is arranged to present at least some of the basis for decisions to a driver of the vehicle in response to a command from the driver.

5. The vehicle according to claim 3, wherein the presentation computer device is arranged to automatically present at least some of the basis for decisions to a driver of the vehicle without any special command from the driver.

6. The system according to claim 1, further comprising:
   transferring means arranged for transferring at least some of the set of rules and the basis for decisions to a command computer device which is arranged to control the behavior of a vehicle without influence of a driver.

7. A vehicle, comprising:
   a command computer device comprising at least a set of rules and a basis for decisions transferred to the command computer device with the system according to claim 6, wherein the command computer device is arranged to control at least a part of the behavior of a vehicle without the influence of a driver.

8. The system according to claim 1, wherein the system is arranged such that the behavior of at least one of the driver and the vehicle is divided into a plurality of states for different situations in which the vehicle may be, wherein the plurality of states are divided into a network or a hierarchy of states, wherein the system is arranged to show, in response to a command from a user via said user interface, a window which illustrates the network or hierarchy of states.

9. The system according to claim 8, wherein the system is arranged such that each state comprises a plurality of the rules which are divided into one or more rule-blocks which concern different aspects of the state, wherein the rule or rules which form part of a certain rule-block on a command from a user via the user interface are shown as a ruleblock window.

10. The system according to claim 9, wherein the system is arranged to show in the rule-block window all premises and conclusions which form part of the different rules which form part of a certain rule-block, wherein for each rule in the rule-block the indications which indicate the conditions and cases are shown as marks for the respective premises and conclusions.

11. The system according to claim 10, wherein the system is arranged such that a user with the help of the second means of the user interface may change the indications of the indicators.

12. The system according to claim 1, wherein the system is arranged such that a rule is organized such that it may comprise several conclusions, wherein each conclusion is assigned an indicator which may indicate two different cases, a first case which indicates that the conclusion shall be executed or a second case which indicates that the conclusion shall not be executed, wherein a conclusion is meant to be executed if all of said premises fulfill the conditions set by the assigned indicators and the indicator of the conclusion indicates said first case.

13. A method of generating basis for decisions concerning the behavior of at elast one of a vehicle and of a driver of a vehicle, the method comprising:

creating a set of rules for how at least one of the driver of the vehicle and the vehicle shall behave in different situations, providing a user interface comprising first means for presenting information to a user of the rules and second means for inputting instructions such that a user with the help of the second means may modify the set of rules, wherein the rules are created such that each rule comprises at least one predetermined premise which may either be true or false and at least one predetermined conclusion, wherein each premise in the rule is assigned an indicator which may indicate three different conditions, wherein the three conditions comprise a first condition which is that the premise shall be true, a second condition which is that the premise shall be false and a third condition which is that it does not matter whether the premise is true or false, and wherein at least one conclusion in the rule is suited to be executed if all of the premises fulfill the conditions set by the assigned indicators, and adapting at least some of the rules with conclusions belonging thereto to a form such that they are suited o form the basis for decisions concerning the behavior of at least one of the vehicle and of the driver of the vehicle.

14. The method according to claim 13, further comprising:

transferring at least some of the set of rules and the basis for the decisions to a presentation computer device which comprises means for presenting the basis for decisions to a driver of a vehicle while the vehicle is in operation.

15. The method according to claim 13, further comprising:

transferring at least some of the set of rules and the basis for decisions to a command computer device which is arranged to control the behavior of a vehicle without the influence of a driver.

* * * * *